United States Patent [19]

Wumer

[11] Patent Number: 5,320,151
[45] Date of Patent: Jun. 14, 1994

[54] DECORATIVE TRIM PANEL AND METHOD OF MANUFACTURE AND INSTALLATION THEREOF

[76] Inventor: William R. Wumer, 30294 Waterford Dr., Perrysburg, Ohio 43551

[21] Appl. No.: 40,110

[22] Filed: Mar. 30, 1993

[51] Int. Cl.$^5$ ............................................. B27D 1/00
[52] U.S. Cl. ..................................... 144/348; 144/346; 144/350; 144/355; 144/364; 144/367; 144/368; 144/372; 144/380; 144/353; 156/63; 156/71; 296/901; 428/99; 428/31; 29/525.1
[58] Field of Search ...................... 428/31, 33, 80, 81, 428/99, 100, 177, 187; 296/29, 191, 901; 156/63, 71; 29/525.1; 144/329, 345, 346, 350, 352, 353, 364, 367, 371, 372, 380

[56] References Cited

U.S. PATENT DOCUMENTS 1,394,120 10/1921 Rockwell ............................ 144/350
3,869,332 3/1975 Loew ................................... 156/63

Primary Examiner—W. Donald Bray
Attorney, Agent, or Firm—Marshall & Melhorn

[57] ABSTRACT

A decorative trim panel having a frame built up of individual frame members joined together in an end-to-end relationship to provide a frame or frame assembly. The frame is provided with a channel in the inside lower edges which accepts a second panel.

14 Claims, 6 Drawing Sheets

DECORATIVE TRIM PANEL AND METHOD OF MANUFACTURE AND INSTALLATION THEREOF

BACKGROUND OF THE INVENTION

1. Field of the Invention

The present invention relates broadly to the field of decorative trim panels. More particularly, the invention relates to decorative wooden trim panels for attachment to a substrate.

Most particularly, the invention relates to the manufacture of decorative wooden trim panels to be attached in an overlaying relationship on an automobile station wagon to simulate the early look of station wagons using wood in the construction thereof.

2. Description of the Prior Art

In the earlier days of the automobile, wood was used as a component in building up the body of the automobile. The body would then be attached to the chassis. When wood was used in the automobile body style commonly known as an "estate wagon" or a "station wagon", a particularly aesthetic and pleasing appearance was obtained. As technology progressed, the use of wood components in automobile bodies all but vanished. However, the longing of the populous for the aesthetic look of wood in automobiles continues to this day, and many attempts in the art have been made to simulate the wood look.

An early such attempt involved applying wood veneer and wood border or frame strips to the vehicle panels. This proved to be relatively costly, as it required many individual pieces and a long installation time. Also, earlier wood coating technology was not sufficient to prevent the wood strips from discoloring in a relatively short time upon exposure to the elements.

A later attempt involved achieving a wood panel effect by adhering a thin film of plastic material to the vehicle panels. Such a film is shown in the U.S. Pat. No. 3,452,861 issued to J. V. Erwin. The wood border was formed by attaching separate molding strips of plastic or metal around the plastic film. It was found that the plastic film was relatively susceptible to scuffing and scraping, and unless extreme care was taken, the appearance would rapidly degrade. Such degradation of appearance was particularly noticeable if the vehicle was washed often in an automatic car wash.

Later attempts in the art, such as disclosed in U.S. Pat. No. 3,709,770 issued on Jan. 9, 1973 to Clifford E. Hale, and U.S. Pat. No. 3,869,332 issued on Mar. 4, 1975 to Theodore Lowe, provided a "wood look" by using various thermoplastic materials.

However, it is felt by some in the art that the simulation of wood by use of thermoplastic materials does not present a particularly aesthetic or pleasing effect. Those skilled in the art have continued to search for an effective method for manufacturing and installing decorative trim panels made of real wood to the corresponding body panels of a "station wagon" to regain the aesthetic effect had by the early wooden station wagons.

SUMMARY OF THE INVENTION

The present invention advantageously overcomes the problems found in prior art trim structures by providing a decorative trim panel having a frame built up of individual frame members joined together in a desired relationship, such as an end-to-end relationship, to provide a frame or frame assembly. The frame is provided with a channel in the inside edges which accepts a preformed panel.

In one embodiment of the present invention, the frame or frame assembly may be built up of frame members of any desired material. A preformed panel, which is inserted in a channel in the rear or underside of the frame can be of the same, or a different material, from the frame.

In another embodiment of the present invention, a decorative wood trim panel is provided including a frame built up of a series of wooden frame members glued together in an edge-to-edge relationship by an ultrasonic wood welder to form a frame of a predetermined shape. A channel is routed on the inside edges of the frame member to accept a preformed wooden panel. Fiberglass is applied to the back of the assembly to provide strength. A suitable coating is applied to the front of the assembly for durability against the elements.

In yet another embodiment of the present invention, a method of installing a series of wooden trim panels to the body panels of a station wagon.

One of the objects of the present invention is to provide a unique decorative trim panel having a built up frame which accepts a center preformed panel.

Another object of the present invention is to produce a decorative wooden trim panel having a frame built up of a series of wooden frame members glued together in an end-to-end relationship. The frame holds a wooden preformed panel in a groove routed in the back thereof.

Still another object of the present invention is to provide for a method of installing a series of wooden trim panels to the body of a station wagon.

A further object of the present invention is to provide a decorative wooden trim panel having sufficient strength to endure exposure to the elements.

A still further object of the present invention is to provide a decorative wooden trim panel having an underside closely contoured to the body of the automobile to which it is to be attached.

Further objects and advantages of this invention will be apparent from the following description and appended claims, reference being made to the accompanying drawings forming a part of the specification, wherein like reference characters designate corresponding parts in the several views.

It is to be understood that the present invention is not limited in its application to the details of construction and arrangement of parts illustrated in the accompanying drawings, since the invention is capable of other embodiments, and of being practiced or carried out in various ways within the scope of the claims. Also, it is to be understood that the phraseology and terminology employed herein is for the purposes of description, and not of limitation.

DESCRIPTION OF THE PREFERRED EMBODIMENTS

Figure 1:
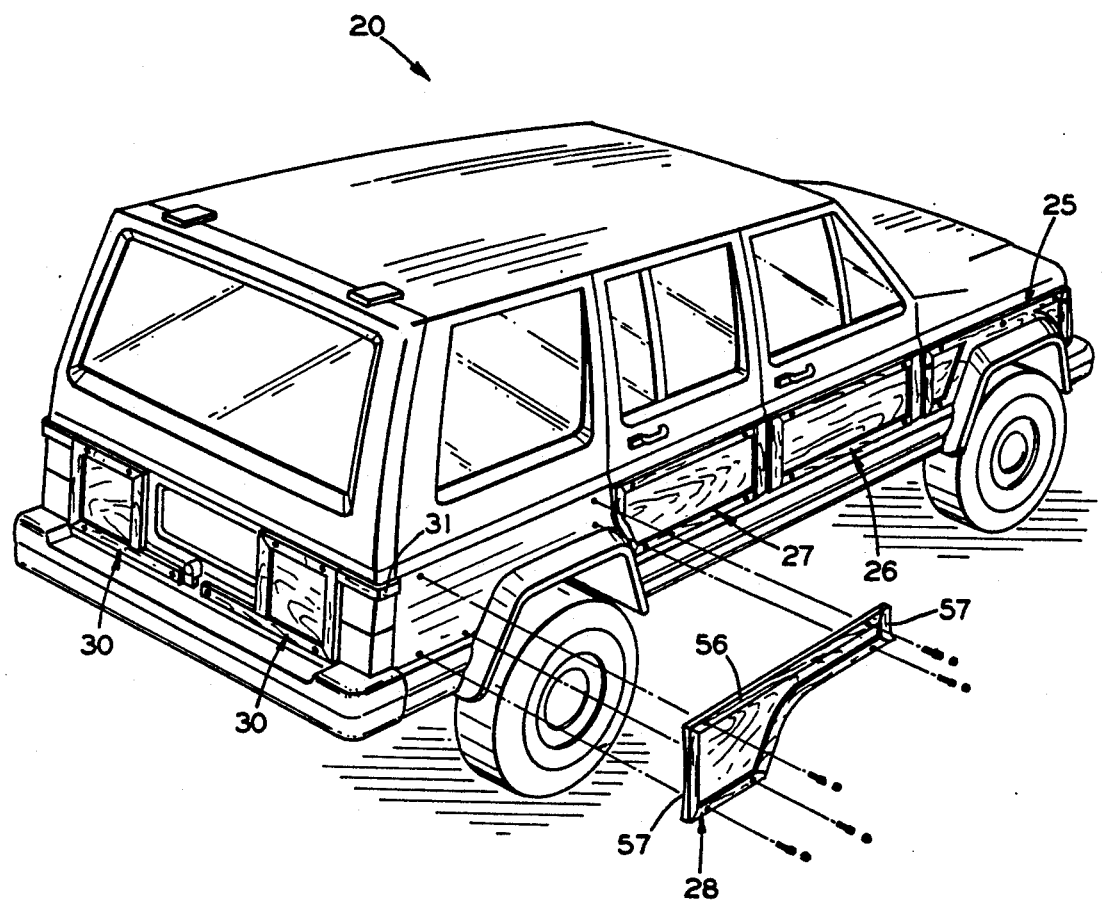
FIG. 1 is a partially exploded perspective view of a station wagon with trim panels embodying the construction of the present invention applied to the body of a station wagon using the method of the present invention.
Figure 2:
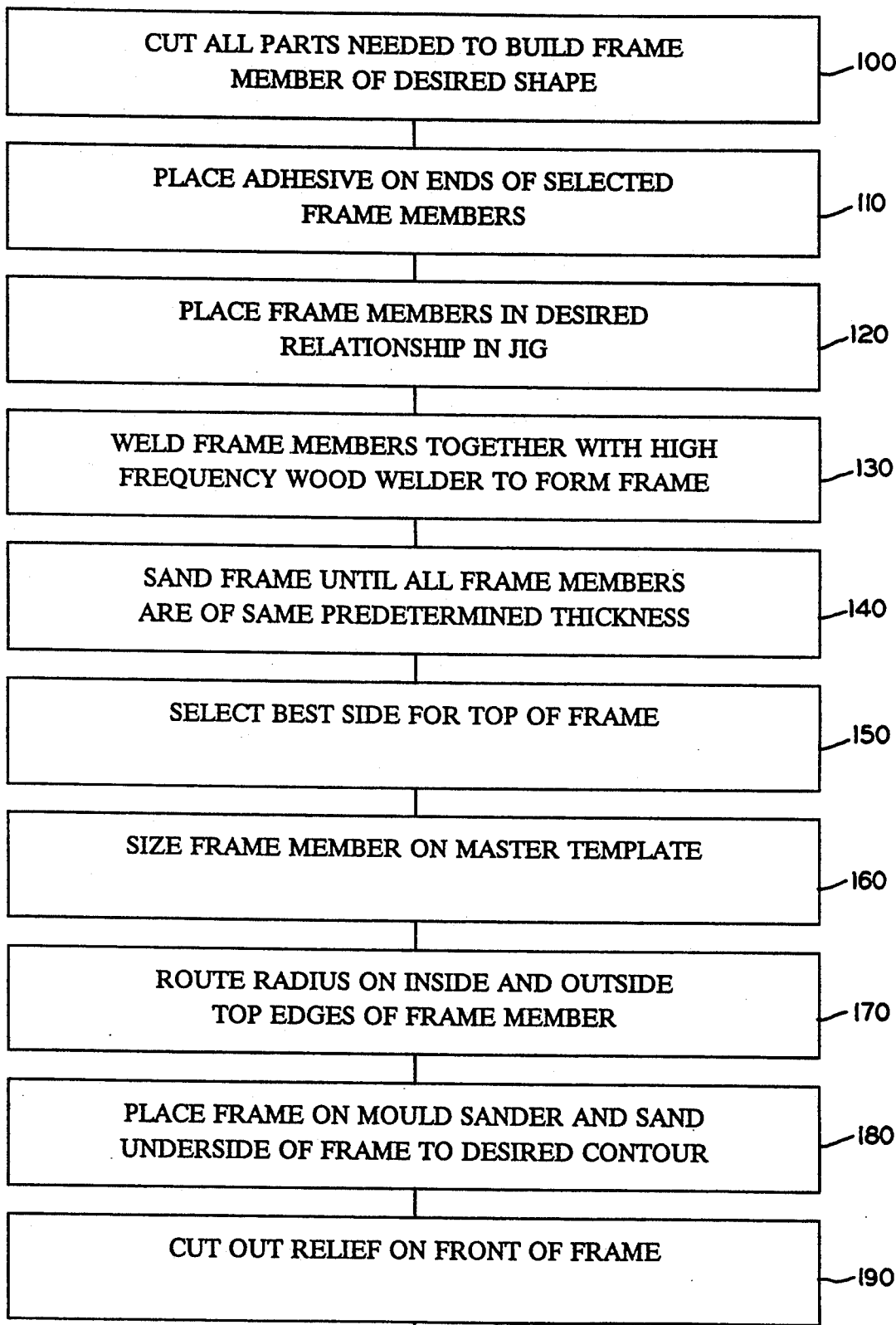
FIG. 2 is a flow chart showing some of the steps used in the method of manufacturing the construction of the present invention.
Figure 3:
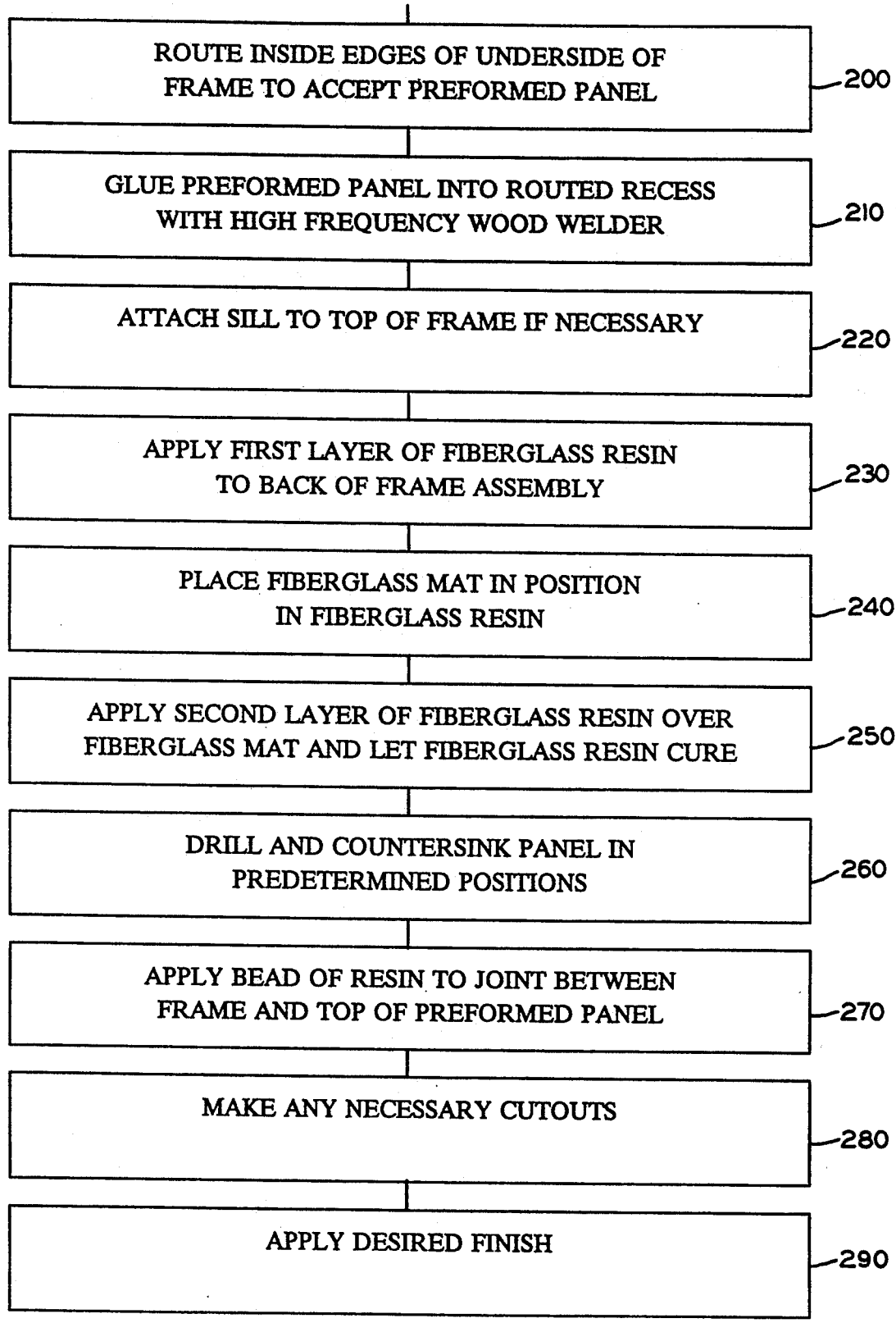
FIG. 3 is a flow chart showing the remainder of the steps used in the method of manufacture of the construction of the present invention.
Figure 4:
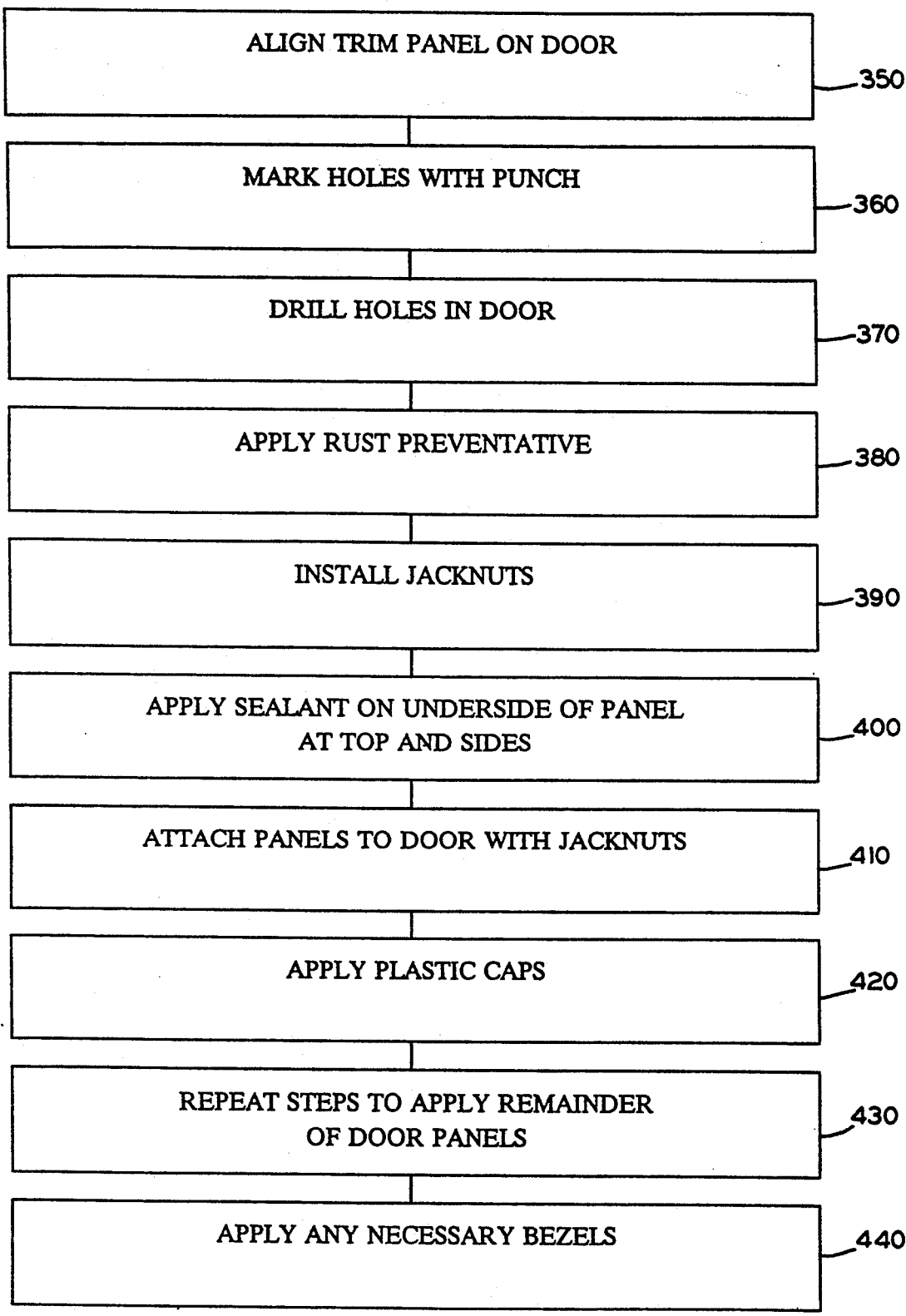
FIG. 4 is a flow chart showing the steps used in a system of installing a construction embodying the present invention to an automobile.

Referring to FIG. 1, there is shown a "station wagon" type vehicle generally designated by the numeral 20. The vehicle 20 includes, on opposite sides thereof, decorative wooden trim panel assemblies including front fender trim panel assembly 25, front door trim panel assembly 26, rear door trim panel assembly 27, rear quarter trim panel assembly 28, and rear or tailgate trim panels 30. Depending upon the particular use or application of the present invention, various additional rear quarter trim pieces 31 may be needed to complete the decorative effect.

It can be readily understood that the present invention is applicable to two-door station wagons, as well as four-door station wagons. In the case of a two-door station wagon, the rear door trim panel assemblies 27 would not be needed. Also it is well within the scope of the present invention to use the method and apparatus disclosed herein on vehicles other than station wagons, such as on mini-vans, full-size vans, small pick-up trucks, and other vehicles.

Figure 5:
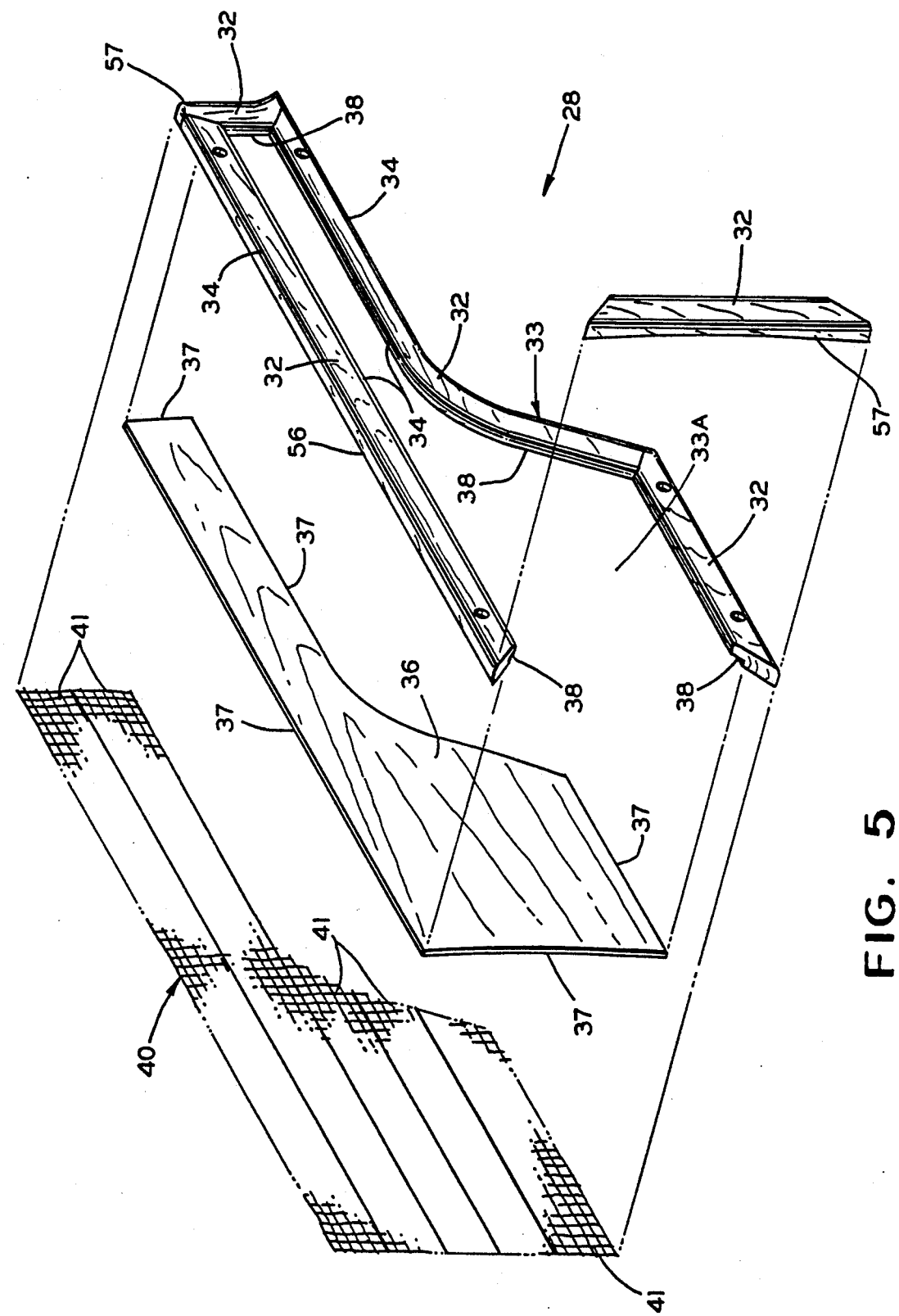
FIG. 5 is an exploded view showing the components of a decorative wooden trim panel embodying the present invention.
Figure 6:
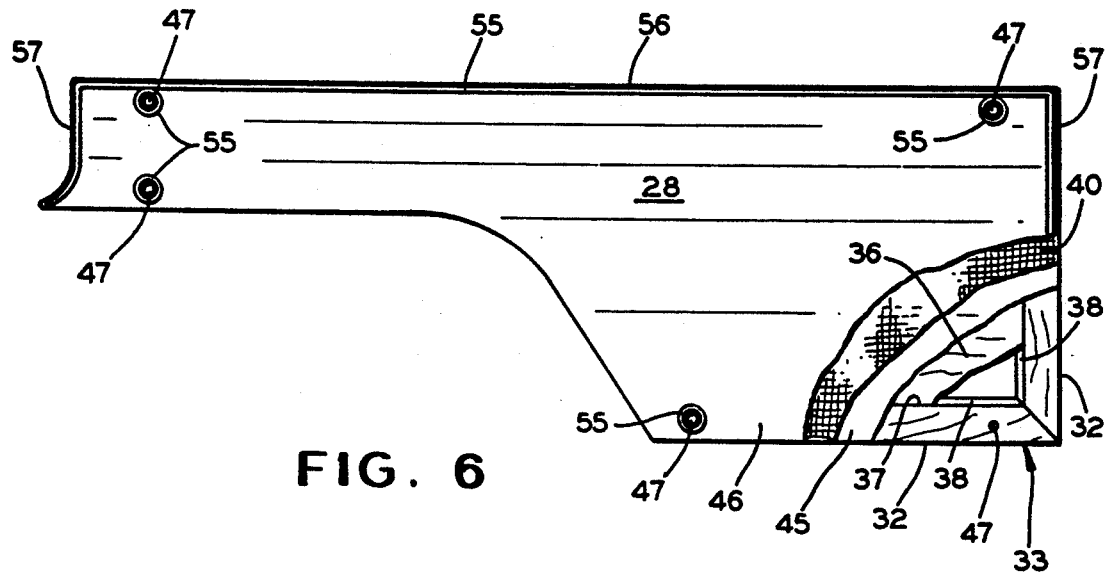
FIG. 6 is a rear elevational view of the construction shown in FIG. 5, partially cut away to show the various layers of the construction.
Figure 7:
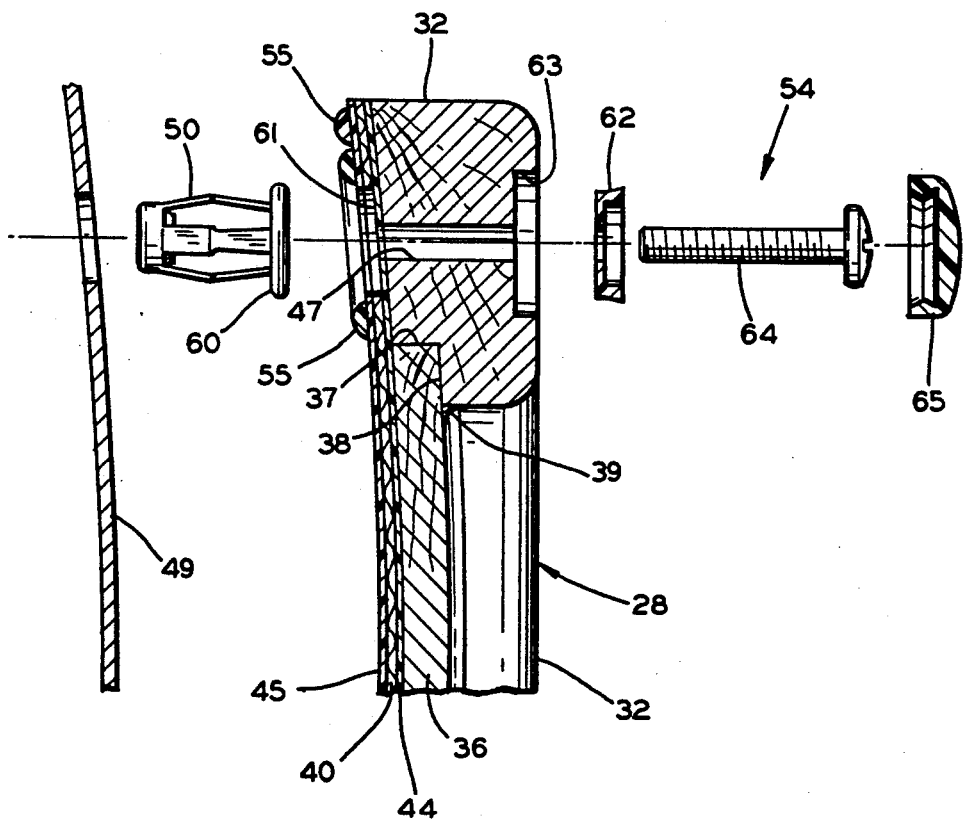
FIG. 7 is a partial exploded view showing how the construction of the present invention is installed to a substrate using the method of the present invention.

For ease of understanding, the construction of the present invention, and the method of construction, will be described in connection with the rear quarter trim panel assembly 28, as best shown in FIGS. 1 and 5-6. It will be easily understood by those skilled in the art that the method described hereinafter applies equally well to the front fender assembly 25, the front door assembly 26, the rear door assembly 27, and the rear panel assembly 30, as well as to any other trim panel assembly embodying the present invention.

Referring to FIGS. 1-3 and 5-6, to form the rear quarter trim panel assembly 28, a plurality of frame members 32 are provided. The frame members are formed typically from a desired hard wood which has been dried to 7% moisture and shrunk. Preferred hard woods are white ash, oak, maple or teak, although other woods may be used depending on the particular application. The kiln drying of these particular woods to 7% moisture has been found to provide good results. The use of other woods may require a different moisture content. All the parts needed to build a frame 33 of a desired shape, and enclosing a panel accepting space 33A are cut from the selected hard wood, and then angles are cut on the parts as necessary to form the frame (box 100). Adhesive is next placed on the ends of each of the frame members (box 110). A preferred glue for this purpose has been found to be Franklin Multi Bond AP-2, although other adhesives may be used. The frame members 32 are then placed in jigs well known in the art (not shown), and secured with jig clamps (box 120), while the adjacent ends are joined together with a high frequency wood welder (box 130).

If desired or necessary, the next step in the method of the present invention is to sand the frame or frame assembly 33 thus formed on a wide belt sander until the frame assembly 33 is of a uniform thickness (box 140).

If desired for the particular application, the best side of the frame assembly 33 is chosen to be the top of the frame (box 150). The frame assembly 33 is sanded on an edge belt sander to fit into master templates (box 160).

If desired for a particular application, a radius 34 is provided on the inside and outside edges of the top of the frame member 33 for a pleasant feel and appearance. Any method of providing the radius may be used, but it is preferred that a radius be routed on the inside and outside top edges of the frame member (box 170).

An important step in the method of construction of the present invention is to then place the frame 33 on a mould sander. The underside or back of the frame assembly 33 is sanded to a desired contour to match the body of the automobile to which the decorative wood panel is being attached. It can be readily understood that there may be many contour blocks needed to produce a set of panels for a particular vehicle, and each vehicle will have its own set of contour blocks. Many different considerations will govern the number of contour blocks needed for the particular vehicle. The frame members for different vehicles are almost always different sizes, and the formations around fenders, doors, and rear panels dictate a large number of contour blocks. Different types of rear doors or tailgates will also dictate different contour blocks, and in some cases, different numbers of panels. In some applications, a one-piece panel, extending the entire distance from one side of a tailgate to the other, is possible. Sometimes, the panel must be of a different contour to fit a tailgate that opens about a vertical hinge means rather than folding downwardly about a horizontal hinge means. Sometimes, rear doors or tailgates require two panels because of the license plate frame. The number of panels and contour blocks may vary from application to application.

The same considerations that dictate the number of panels, and the amount of contour blocks needed for the mould sander, may also dictate whether any reliefs must be cut out on the front of the frame 33. If it is necessary to cut a relief on the front of the frame member 33 (box 190), the frame is placed in a special jig on a band saw and the face of the frame may be band sawed out so as to allow a rear door trim panel assembly 27, for example, to go behind the front door of a vehicle. The same consideration would apply to the front door panel assembly 26.

A novel feature of the present invention is the provision for the frame assembly 33 to hold a preformed panel 36 to fill the space formed by the inside edges of the frame members 32. The outer peripheral edges 37 of the panel 36 are held in corresponding grooves or channels 38 provided in the inside edges of the underside of the frame assembly 33. The grooves or channels 38 may be provided in any suitable manner, but in the preferred embodiment of the present invention, wherein the frame members 32 are made of wood, the channels 38 are formed by being routed (box 200). A suitable adhesive is placed in the grooves 38, which may be the same as was placed on the end of the frame members 32. A Franklin Multi-Bond AP-2 glue has been found to be satisfactory. After the glue is applied, the preformed or wood panel 37 is glued into the routed recess with a high frequency wood welder (box 210).

At this point, the frame assembly 33 is usually reinspected and resized with the master template (box 160) and touch sanded.

Some vehicles, depending on the particular application, will need to have a top sill attached to the top of the frame assembly 33. Usually, the sill is ⅜" thick and of a length equal to the length of the frame. It has been previously cut out to go by side view mirrors and rear windshield wipers, etc. If a sill is needed, it is glued to the frame with a high frequency wood welder (box 220) in the same manner the preformed panel is glued into the routed recess in the frame member 33 (box 210).

At this point in the method of construction of the present invention, the basic rear quarter panel assembly 28 has been completed, and the following steps are necessary to add strength and durability.

First, a first layer of fiberglass resin 45 (FIG. 6) will be applied to the back of the rear quarter panel assembly 28. The particular resin to be chosen will depend on the particular applications and materials being used. A preferred resin for a decorative wood trim panel may be such as the Series CER-112 2-Part Epoxy Resin System available through the Ad-Tech Plastics Systems Corp. of Charlotte, Mich. After a first layer of fiberglass resin 45 is applied to the back of the frame assembly (box 230), a fiberglass mat 40 is formed across substantially the entire underside of the rear quarter panel assembly 28. The particular method of forming the mat will again vary depending on application and materials. In some applications, a solid fiberglass mat may be used, but for the decorative wood trim panel forming the preferred embodiment of the present invention, it is preferred to form the fiberglass mat using fiberglass woven edge tapes which may be such as those available through MagneTek Hesgon of Brownsville, Tex. Strips of tape 41 are placed in the resin, preferably in edge-to-edge abutment, until substantially the entire undersurface of the rear quarter panel trim assembly 28 is covered (box 240). A second layer of fiberglass resin 46, which may be the same as the first layer 45, is applied over the fiberglass mat, and the resin is left to cure (box 250).

After the resin has cured, the trim panel assembly 28 is drilled and countersunk in predetermined positions (box 260) depending on the application. A series of holes, such as holes 47 having upper countersinks 63 and lower countersinks 61 are formed.

Next, a bead of epoxy resin 39 is applied to the joint between the frame assembly 33 and the wood panel 37 (box 270).

If the particular panel section being formed requires any cutouts for door locks, door handles, or gas doors, these panels are then put in jigs and the cutouts are made as necessary (box 280).

The panel sections are now ready for their exterior finish. The particular exterior finish applied may vary widely depending on materials being used, and the particular application to which the trim panels are being put. For the preferred embodiment of the present invention, wherein decorative wood trim panels are being manufactured, a preferred finish used on the face or exterior of each of the panel assemblies 25-28 may be such as Awl-Brite clear urethane marine varnish available from U.S. Paint of St. Louis, Mo.

Ten coats are applied. The varnish is applied two coats at a time. A first coat is applied, allowed to dry 45 minutes, a second coat is then applied, allowed to dry 45 minutes, and lightly sanded. This procedure is repeated four more times until a total of ten coats have been applied. This will complete the step of applying the desired finish (box 290).

Once the decorative trim panel is produced, the panel is applied to the particular substrate, such as for example, the body of the station wagon 20. In the particular embodiment shown in FIG. 1, the method just described has been used to produce a pair of front fender trim panel assemblies 25, a pair of front door trim panel assemblies 26, a pair of rear door panel assemblies 27, a pair of rear quarter trim panel assemblies 28, a pair of rear or tailgate trim panel assemblies 30 and a pair of rear quarter trim pieces 31.

Referring to FIGS. 1, 4, 6 and 7, it is preferable according to the method of the present invention that either front door trim panel assembly 26 be applied first. In the particular illustration shown, the front door trim panel assembly 26 may be simply aligned on both sides of the door (box 350). If the panel assembly 26 had an opening or key hole for alignment with a key lock, this would also be taken into account in the alignment.

The next step is to mark the holes to be drilled in the door (box 360). This is done by any suitable means, usually by marking with a punch passed through the holes 47 which were previously drilled and countersunk. Next, the holes are drilled in the sheet metal panel 49 of the door (box 370) and a rust preventative compound is applied (box 380) around the holes to militate against the formation of rust. A preferred rust preventative compound is marketed and sold under the trademark "Farachrome". It will be understood that other rust preventatives may be used.

Jacknut assemblies 54 are installed in the holes formed in the panels 49 (box 390). The base portion 50 of the jacknut assembly 54 is inserted through the holes in the panel 49, and may be fastened with a jacknut wrench (not shown) well known in the art. A bead 55 of sealant is then applied on the underside of the panel 28 adjacent the top edge 56 and side edges 57. The preferred sealant of the bead 55 is sold under the trademark GE Silicon 50. The bead 55 is applied (box 400) to prevent moisture and other contaminants from contacting the surface of the panel 49 in juxtaposition to the undersurface of the decorative panel 28. The bottom of the panel 28 is open to release any moisture formed by condensation, for example, trapped behind the panel 28. A bead of sealant 55 is also typically applied around any of the holes 47 on the inner surface of the panels 28.

Next, the panel 28 is secured to the door 49 by the remainder of the jacknut assembly 54 (box 410). The panel 28 is positioned adjacent the door 49 such that the head 60 of the jacknut 50 is received by the inner countersink 61 formed on the inner surface of the panel 28 concentrically of the hole 47. Next, the retainer portion 62 of the jacknut assembly 54 is placed in the outer countersink 63, formed concentrically of the hole 47. The threaded shank 64 of the jacknut assembly 54 is then passed through the retainer 62, the hole 47, and is threadably received by the jacknut 50 and tightened. Decorative plastic caps 65 are then snapped or press fitted to the retainer 62 (box 420) to appropriately cover the head of the threaded shank 64.

Steps 350-420 are repeated to apply the remainder of the door panels (box 430). Preferably, the other front door panel assembly 26 would be next applied. The two rear door panel assemblies 27, if any, are next applied. Then the rear quarter panel assemblies 28 would be applied, followed by the front fender trim panel assemblies 25. Finally, the rear or tailgate trim panel or panels 30 are applied, followed by the rear quarter trim pieces 31. It can be readily understood that the rear quarter trim pieces 31 may also be prepared using the method of construction of the present invention, or may be prepared using other known wood working methods.

Either after each decorative trim panel is installed (box 330), or after all the necessary trim panels are installed, any necessary bezels would be applied (box 440). These are usually plastic injection molded bezels furnished by the manufacturer for door handles, key holes and gas tank doors. A bead of a silicone material, such as the aforementioned GE-Silicone 50 is applied to the back of the bezel, and it would be affixed to the proper holes provided by the manufacturer in the vehicle body.

By carefully studying the problems present in the art of decorative trim panels as applied to substrates, such as automobile bodies, a new and novel decorative wooden trim panel has been provided, together with a novel method for its manufacture, and a further novel method for its installation.

What is claimed is:

1. A method of producing a decorative panel, including the steps of:
   a) providing a frame member of a predetermined size and shape,
   b) forming the underside of said frame to a desired contour,
   c) forming a channel on the inside edge of said frame to accept a second panel, and
   d) adhesively attaching said second panel within the channel of said frame.

2. The method defined in claim 1, including the further steps of:
   a) selecting the best side of said frame for use as the top of said frame,
   b) sizing said frame on a master template, and
   c) providing a radius on the inside and outside top edges of said frame, all before forming the underside of said frame to a desired contour.

3. The method defined in claim 2, and including the further steps of:
   a) applying a coat of fiberglass resin to the back of the assembly formed by said preformed panel and said frame,
   b) placing a fiberglass mat in position in said fiberglass resin to cover substantially the underside of said assembly,
   c) applying a second coat of fiberglass resin over said fiberglass mat, and letting said fiberglass resin cure,
   d) drilling and countersinking said frame assembly in a predetermined number of positions,
   e) applying a bead of resin to the joint where the front of said second panel meets said frame, and
   f) applying a finish to the front of said assembly.

4. The method defined in claim 3, and including the
   a) sanding said frame member to a predetermined thickness.

5. The method defined in claim 4, and including the further step of cutting out any needed reliefs on the front side of said frame before forming said channel on the inside edges of the underside of said frame.

6. The method defined in claim 5, and including the further step of:
   a) attaching a sill where needed to the top of said frame.

7. A method of producing a decorative wood trim panel, including the steps of:
   a) providing a wooden frame member of a predetermined size and shape,
   b) placing adhesive on the ends of selected wooden frame members,
   c) placing said wooden frame members in a desired relationship in a jig, and
   d) welding said wooden frame members together with a high-frequency wood welder to form a frame of a desired shape,
   e) placing said frame on a mould sander and sanding the underside of said frame to a desired contour,
   f) routing a channel on the inside edges of the underside of said frame to accept a preformed wood panel,
   g) gluing said preformed wood panel to said routed recess with a high-frequency wood welder,
   h) applying a coat of fiberglass resin to the back of the assembly formed by said preformed wood panel and said frame,
   i) placing a fiberglass mat in position in said fiberglass resin to cover substantially the underside of said assembly,
   j) applying a second coat of fiberglass resin over said fiberglass mat, and letting said fiberglass resin cure,
   k) drilling and countersinking said frame assembly in a predetermined number of positions,
   l) applying a bead of resin to the joint, where the front of said preformed wood panel meets said frame, and
   m) applying a finish to the front of said assembly.

8. The method defined in claim 7, including the additional steps of:
   a) selecting the best side of said frame member for use as the top of said frame,
   b) sizing said frame on a master template, and
   c) providing a radius on the inside and outside top edges of said frame, all before placing said frame in said mould sander.

9. The method defined in claim 8, and including the further step of:
   a) sanding said frame until all of said frame members are of a predetermined thickness before selecting the best side of said frame for use as the top of said frame.

10. The method defined in claim 9, and including the further step of cutting out any reliefs needed on the front side of said frame before routing a channel on the inside edges of the underside of said frame.

11. The method defined in claim 10, and including the further step of attaching a sill where needed to the top of said frame before applying a coat of fiberglass resin to the back of said frame.

12. The method defined in claim 11, and including the further step of making any necessary cutouts in the front of said panel before applying a finish to the front of said assembly.

13. The method defined in claim 12, wherein the step of placing adhesive on the ends of selected wooden frame members includes the step of placing adhesive on the ends of all of said wooden frame members.

14. The method defined in claim 12, wherein the step of placing said wooden frame members in a desired relationship in a jig includes the step of placing said wooden frame members in an end-to-end relationship in said jig.

* * * * *